Sept. 4, 1923.
R. JOKSCH
MULTIPLYING MACHINE
Filed Feb. 4, 1922
1,467,042
6 Sheets-Sheet 1
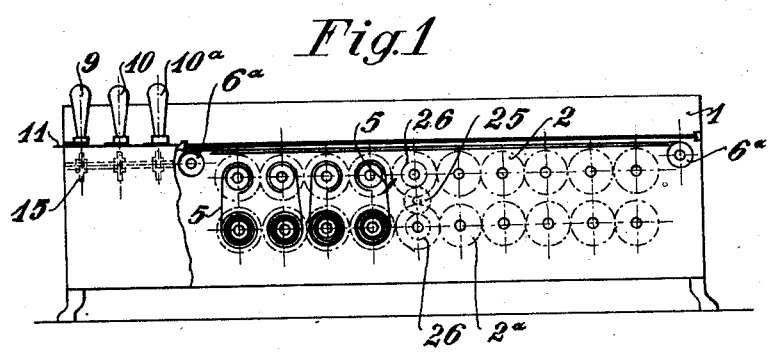
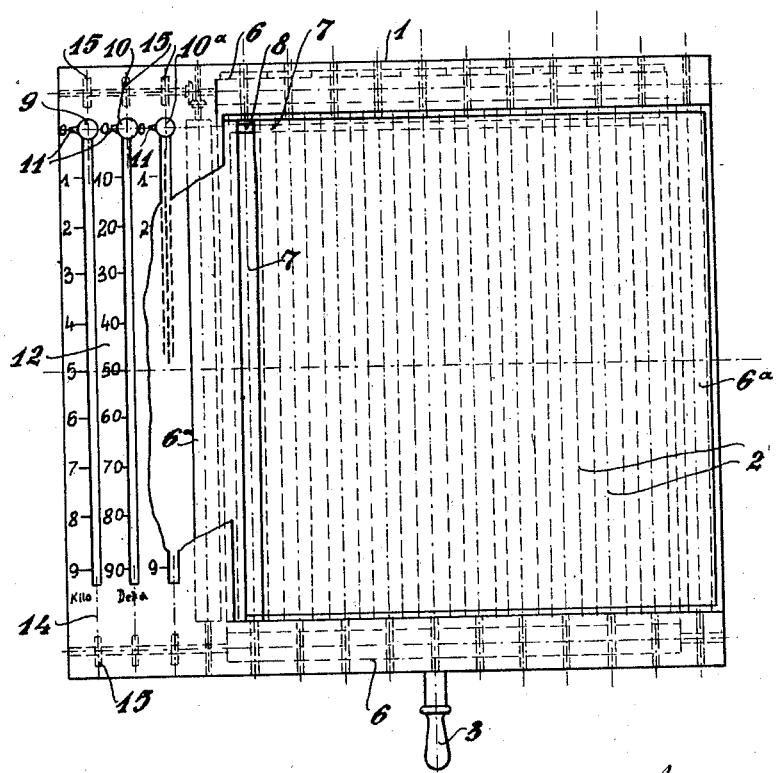

Sept. 4, 1923.

R. JOKSCH

MULTIPLYING MACHINE

Filed Feb. 4, 1922

Inventor:
Rudolf Joksch

Sept. 4, 1923.

R. JOKSCH

MULTIPLYING MACHINE

Filed Feb. 4, 1922

Inventor:
Rudolf Joksch
By
Atty.

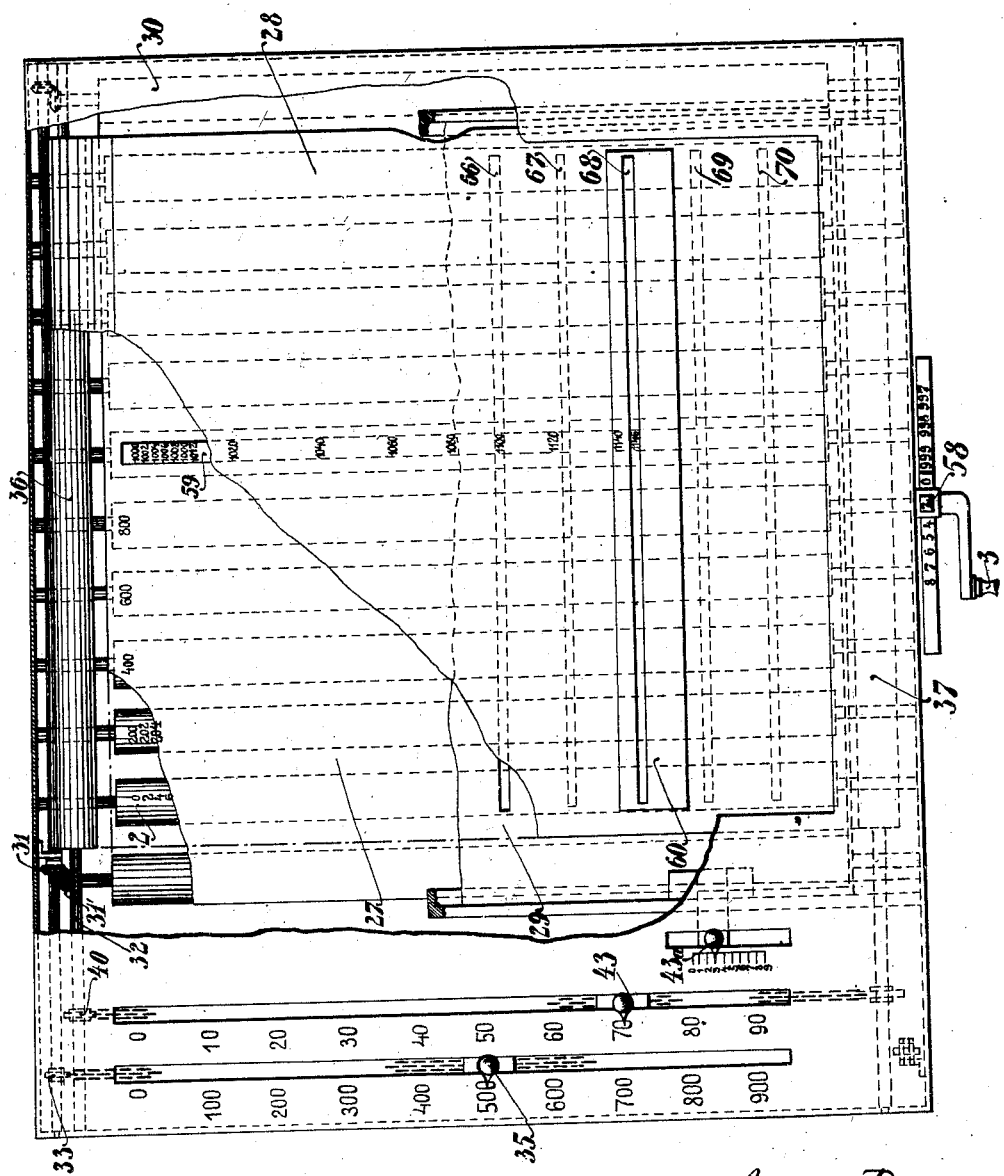

Fig. 12

Patented Sept. 4, 1923.

1,467,042

UNITED STATES PATENT OFFICE.

RUDOLF JOKSCH, OF PRAGUE-KAROLINENTHAL, CZECHOSLOVAKIA.

MULTIPLYING MACHINE.

Application filed February 4, 1922. Serial No. 534,057.

*To all whom it may concern:*

Be it known that I, RUDOLF JOKSCH, mechanical engineer, citizen of the Republic of Czechoslovakia, residing at Prague-Karolinenthal, Czechoslovakia, have invented certain new and useful Improvements in Multiplying Machines, of which the following is a specification, reference being had therein to the accompanying drawing.

This invention refers to a multiplying machine whereby, by a setting of the multiplicator and the multiplicand, the product of these factors appears in a small travelling window in the apparatus.

The multiplying machines hitherto known are not suitable for use in a retail shop, because, for instance, the salesman has to direct his whole attention to the handling of the machine for the purpose of counting the rotations of the crank and the displacement of the slot of the multiplying machine in progression of tens and consequently finds it difficult to attend to the customer without making mistakes.

Multiplying machines with toothed gearing also operate much too slowly and they are not sufficiently reliable for use in a retail business, as the figure discs under the effect of inertia due to their rapid rotation, often rotate too far and therefore result in an incorrect position.

In accordance with the present invention, the defects above mentioned are done away with and the improved multiplying machine is therefore made particularly suitable for a retail business. It is possible to directly connect the multiplying device with the ordinary recording boxes or also with scales in which the weight is set by a system of levers. It is in this possibility that the advantages of the present invention particularly lie, as it is only necessary to bring in the fundamental price by a simple rotation of the crank or by actuating any working device of the multiplicator. The final amount is then automatically obtained by the setting in or determination of the weight by means of the setting levers of the scales. The series of operations of the different levers of the scales or recording box for obtaining the correct final amount by the multiplying device is then equivalent.

The essential features of the improved multiplying machine are in the first place a tabulation displaced in series of tens in separate strips simultaneously movable round the same distance which tabulation receives in each of its parts the final amount corresponding to the price and, in the second place, two or more bands which are brought before all the tabulating strips at an angle to one another, which bands are each provided with one or more slits arranged vertically to their direction of motion and are displaceable by a lever which can be connected with the bands, so that the slits render visible on the corresponding tabulating strips, in any crossing position, the final amount which corresponds to the position of the lever.

In the accompanying drawing, Fig. 1 shows in elevation the side of the machine turned towards the purchaser.

Fig. 3 is a plan of the machine.

Fig. 11 is a plan on an enlarged scale to better illustrate the operation of the machine. Fig. 12 shows the tabulation.

Figure 4:
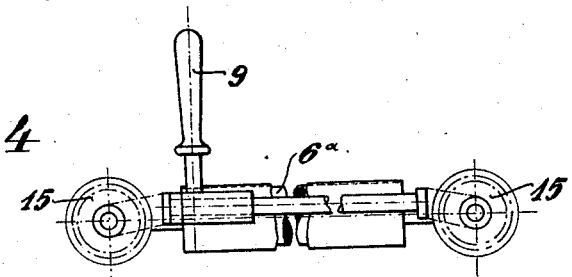
Fig. 4 shows a side view of the device for displacing one of the two slits forming the window-like aperture at their point of crossing.

Arranged in the casing 1 are guide rollers 2 and winding rollers 2ª which may be rotated by means of a crank 3 that is used to indicate the price; or the rollers may be rotated by means of some other device. Running over each pair of rollers 2, 2ª, which may be rotated in unison by means of engaging toothed wheels, is a band 5 furnished with tabulations. These tabulations consist of columns of figures showing the final products of the multiplication of the price and weight of each article. The figures are arranged to run consecutively on each of the columns corresponding to each price. Thus, for instance, by setting the crank 3 for the price 2 upon the first band 5, are shown consecutively the figures 0, 2, 4, . . . 196, 198 in the direction of the axis of the roller 2; on the following band 5, the numbers 200, 202 . . . 396, 398; on the third band 5, the numbers 400, 402 . . . 596, 498 and so on; on the last band (tenth) 1800, 1802 . . . 1998.

Figure 6:
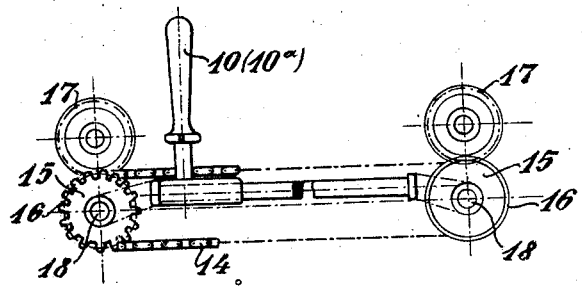
Fig. 6 illustrates a side view of the device for the displacement of the one rectangular slit relatively to the other slit.

For the price 3, set by a very slight rotation of the roller 2, there are shown upon the bands 5 passing over the upper rollers, columns of figures 0, 3, 6, . . . 294, 297 and so on. Thus the bands appear with the column figures showing the final products (final amounts) as parts arranged side by side of a common tabulation containing all the final amounts, which tabulation, in its original form, could not be practically applied as a connected total.

In order that the device may be applied in a small way and therefore be adapted for practical purposes, the tabulation, as previously stated, is subdivided into small tabulation bands in tens which are so wound up above each of the two rollers 2 and 2ª, that by setting the price, corresponding columns also appear on the other rollers 2 on the indicator. The indicator forms a tabulation corresponding to the price which is formed by the upper columns of the separate tabular bands.

Figure 5:
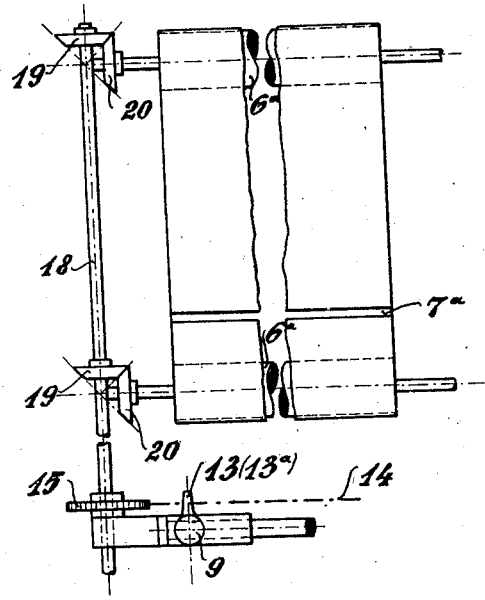
Fig. 5 is a plan view of the same.
Figure 7:
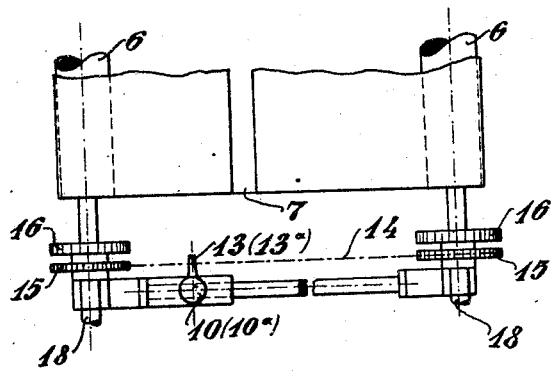
Fig. 7 is a plan view thereof.

In the arrangement with two bands 2 there are provided at the sides of the machine and in a higher position than the guide rollers, two pairs of guide rollers 6 and 6ª arranged in angular relation to each other and upon which run strips, each provided with a slit 7 and 7ª respectively, which slits constitute a travelling window 8 at their crossing point. The guide rollers 6ª and 6 are displaced by means of hand levers 9, 10 and 10ª. On the handle of the lever used to put in position, for instance, the hundreds, the tens and the units, is arranged an indicating finger 11 and such indicating finger can be moved over the corresponding scale 12. The two handles 10 and 10ª each carry, as shown in Fig. 7, a clutch 13 and 13ª which may be brought back to the normal position out of engagement with the chains 14. By actuating one of the two handles the clutch 13 or 13ª corresponding to said handle is brought into engagement with its chain 14, which serves as the actuating element for adjustment of the slit 7. The actuating means comprise toothed wheels that give different transmission, two different speed arrangements (for tens and units) being provided. The slit 7 has as many as 100 different positions which, however, owing to the method of driving in 9 positions for tens and in 9 positions for units are reduced together to 18 positions. The chain 14 passes over two chain wheels 15 and effects the rotation of the guide rollers, through a toothed wheel 16, (Fig. 7) loosely mounted on the shaft 18 and which is rigidly connected with the chain wheel 15. The wheel (16) engages, by means of a pair of toothed wheels which are not visible, a toothed wheel also freely mounted on the guide rollers 18. In this manner the guide rollers 6 can be coupled with the handle of the levers 10, 10ª. The hand levers 10 and 10ª effect the displacement of the slit 7 from top to bottom or vice versa, whilst the handle 9 effects the displacement of the other slit 7ª in the direction from left to right or vice versa, for which purpose, as shown in Fig. 5, the chain wheel 15 is rigidly connected with the shaft 18 and the bevel wheels 19 which convey the motion, by means of bevel wheels 20, to the guide rollers 6ª which are located at right angles to the guide rollers 6. Through the operation of the hand lever 10, the slot 7 by the action of a corresponding toothed wheel gearing is moved ten times as quickly as with the hand lever 10ª, so that, in this manner, the setting of the tens can be effected just as quickly as that of the units.

Figure 8:
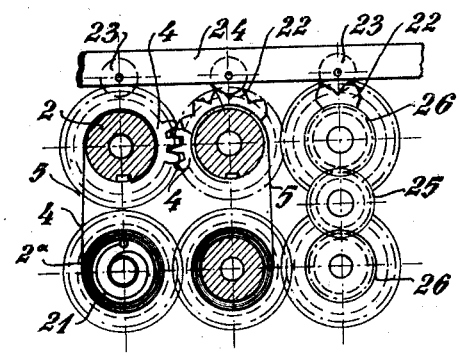
Fig. 8 shows in front and sectional views the arrangement of the guide rollers for the tabulating strips.

Fig. 8 shows the guide rollers 2 with the tabulating band and a variable tensioning device 21 of the well known kind. Locking discs 22 are fitted to retain the guide rollers in position. Mounted on a strip 24 are rollers 23 which engage elastically in the locking discs 22. The intermediate wheel 25 connected with the crank 3 engages with the driving gear 26 on the spindles of the guide rollers.

Of the rollers, which are arranged in two groups, the upper rollers 2, are used for reading off the figures, and hence are provided with the locking device 22 and 23 which retains the rollers in such position that each column of figures comes over the most highly situated surface of the rollers. The lower rollers 2ª serve to carry the tabulating bands, and are provided with the above mentioned variable tensioning devices 21 so as to maintain the bands in tension.

Figures 9, 10:
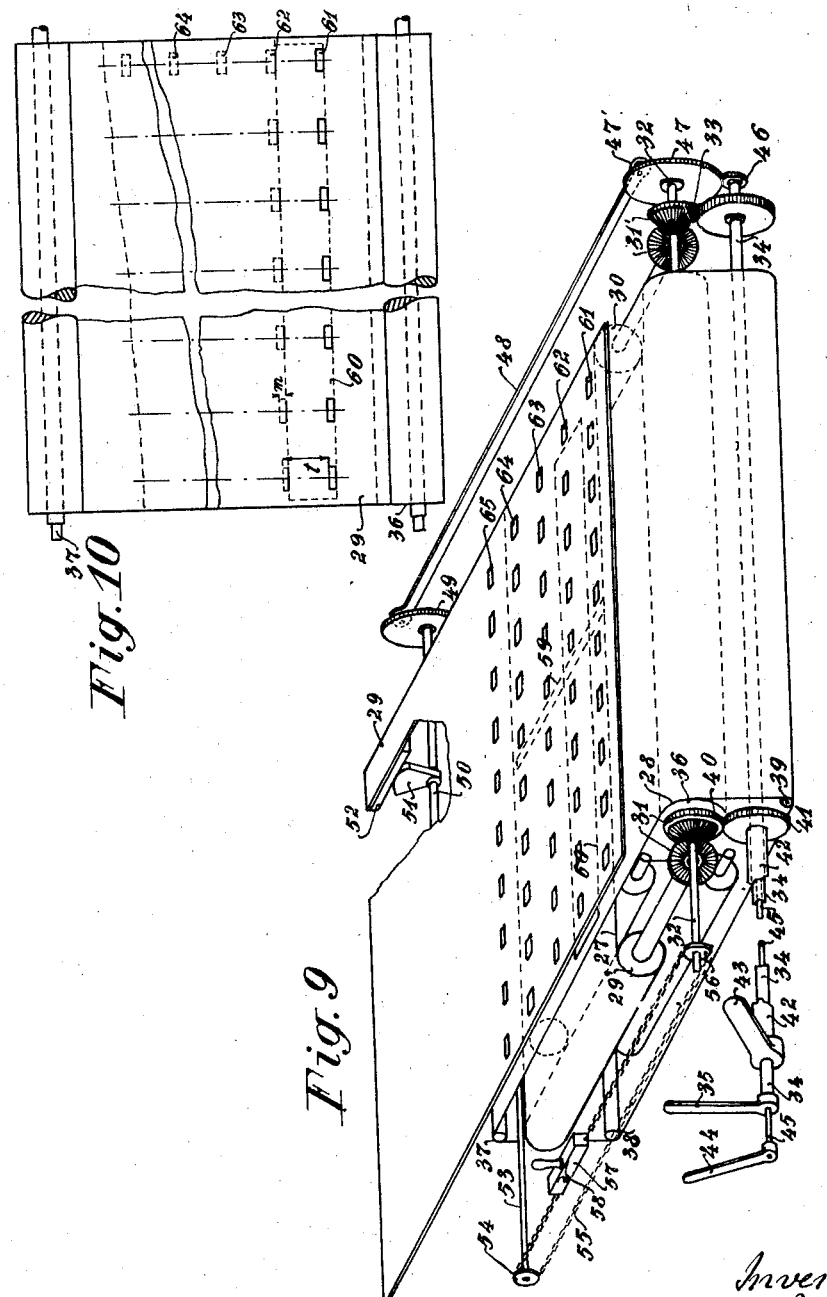
Fig. 9 shows in a perspective view the whole apparatus with three bands for instance.
Fig. 10 is a plan view of the arrangement of the 10th and 1st slit in the machine shown in Fig. 9.

Fig. 9 shows by way of example an arrangement of the device with 3 bands, 27, 28, 29, of which the upper one 29 is indicated in the drawing as a plate. The band 27 is passed over two rollers 29', 30, so that when the two rollers are rotated, in similar manner, the band from the one roller is unwound and wound on the other. The two rollers 29', 30, are rigidly coupled together by means of two pairs of bevel wheels, 31 and 31', one wheel of each which pair is fixed on a shaft 32 adapted to be actuated by a hand lever 35, by means of a hollow shaft 34 mounted on the shaft of the lever and a couple of toothed wheels 33. The third band 28 is an endless band passed over four rollers 36, 37, 38, 39, one of which, namely 36. is the driving roller. This is mounted conjointly with a toothed wheel 40 on the shaft 32, and is driven by the toothed wheels 40, 41, and the hollow shaft 42, by a hand lever 43. The lever 44 actuates a shaft 45 to which is keyed a toothed wheel 46 that gears into a toothed wheel 47, freely mounted on the shaft 32, and which carries a crankpin 47' and actuates a crank disc 49 through a link 48. This transmits the rotation, by means of a shaft 50 to a toothed sector 51 which operates a rack bar 52 and in this manner displaces the plate 29. For the sake of clearness the plate 29 is shown in the drawing as formed with only 5 slots 61, 62, 63, 64, 65, instead of 10. The bands 27, 28, each have a slot, 59, 60 respectively. The guide rollers and winding rollers on which the tabulating bands 27, 28, are mounted are constructed in the same manner as shown in Figs. 1, 2, 3 and 8. They are driven conjointly by means of a shaft 53, which carries a chain wheel 54 over which runs a chain 55. The chain is kept in tension by means of a chain wheel 56 freely mounted on the shaft 32 and is brought in connection with a slide 57, which sets the price by means of a pointer 58 working over a scale, which is not shown, where the price may read off.

The operation, when it is desired to effect multiplying operations, and the manner of working the bands, are as follows:—
By setting the pointer 58 to the figure which indicates the price on the scale associated therewith, the guide rollers or winding rollers of the tabulation are caused to rotate, and these are wound or unwound so that all products of the multiplier (fundamental price) within the scope of the multiplication appear on the upper side of the guide rollers in such a manner that along the upper surface of the roller cylinders, the products of a number are always shown (in the present constructional example from 0 to 9) of the highest place value of the multiplicand, in the first constructional example with two bands. Let us say, for example, that the number 832 is to be multiplied by 573. The indicator sets 832 on the scale, when there appear on the first guide roller all products of 832×0 up to 832×99, on the second guide roller all products of 832×100 to 832×199, etc. In the present constructional example, the last, that is to say, the tenth guide roller shows all products from 832×900 to 832×999. Now, if the slot 59, which here corresponds to the hundreds, that is to say, the third position value, of the multiplicand, is brought into position 5, it leaves the product column of the fifth guide roller free, that is to say, all products from 832×500 to 832×599. If then the slot 60, which in the present example corresponds to the tens, that is to say, the second place value, is brought into position 7, it leaves free out of the product column of the fifth guide roller the section of the product column between the product from 832×570 up to 832×579. This arrangement of the product column yields a strictly graduated order in tenths of the products, lines and columns, so that all products of the units and tens appear in lines, and the products of the hundreds in columns. Any other desired arrangement of the product may, however, be employed. In the constructional example under notice, this arrangement of the products was selected with reference to this example and for the sake of greater clearness. In accordance with the example of calculation shown above, it is only necessary that the so-called unit slots, 61, 62, 63, 64, 65 of the upper plate 29 should be brought into position 3, for the product of 832×573 to be read off through the travelling window, namely 476736. The unit slots are constructed in such a manner that their part, ($t$) Fig. 10, on plate 29 is similar to the width of a tenths slot of one band, and their width ($m$) is a tenth of the width of a tenth slot. By this means, of all the tens spaces which the tenths slot may leave free, only the space of a unit slot is left open, which corresponds to the actual figure of its position value, and of this again the hundredths slot situated underneath leaves only a portion open which corresponds to the multiplicand which has been set, while in consequence of the setting of the multiplier (fundamental price) the product of the two factors appears through the opening.

By increasing the number of the guide rollers and that of the guide bands or slots, the scope of the multiplication may be enlarged to any extent.

Figure 2:
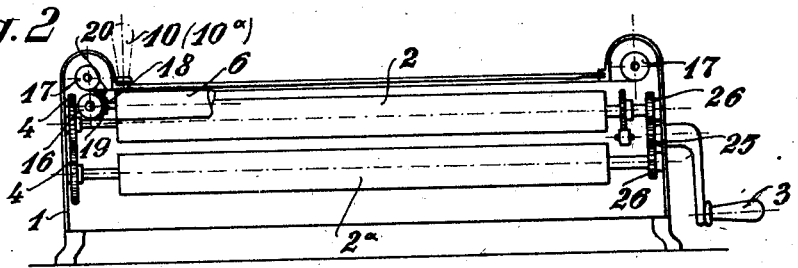
Fig. 2 is an end view of the machine.

With reference to Fig. 11, let it be assumed that 2 shall be multiplied by 573. The operation is then as follows:

Through the rotation of the crank 3 the figure 2 is brought to appear in the window 58. By this rotation of the crank, the rollers 2 and 2ª (the roller 2ª is not visible in Fig. 11), are so rotated that the columns of figures on the 10 rollers will appear at the top of these rollers. Thus, on the first roller tube, at the left hand side of Fig 11, there will appear the column with the products from 2×0 to 2×99. On the second column there will appear the column from 2×100 to 2×199, on the third column the products from 2×200 to 2×299, on the fourth column the products from 2×300 to 2×399, on the fifth column the products from 2×400 to 2×499, on the sixth column the products from 2×500 to 2×599, and so forth (see also the tabulation shown on Fig. 12). All these columns of figures are brought to one level and correspond to the figure 2 appearing through the window 58.

Now, the multiplicand 573 is formed by setting the hand lever 35 for the hundreds into the position 500, the hand lever 43 for the tenths into the position 70 and the hand lever 43ª for the units into the position 3.

By adjusting the hand lever 35 to the position 500, the rollers of the band 27 will rotate to such an extent that the slot 59 will regiser with the sixth roller 2 counting from the left in Fig. 11, so that only the column of figures on the sixth roller will appear in the slot 59, whereas the figure columns on all the other rollers remain concealed.

When the hand lever 43 is adjusted to the position 70, the band 28 with its slot 60 is brought to a position in which, if the bands 27 and 29 were missing, there would be visible on the first roller 2 only the products 2×70 to 2×79, on the second roller the products from 2×170 to 2×179, on the third roller the products from 2×270 to 2×279, etc. As the principal band 27 however, covers all the rollers except the sixth roller on which roller through the band 28 are covered all the figures except those from 2×570 to 2×579, there need only be adjusted now the hand lever 43ª to the position 3 whereby the plate 29 is correspondingly moved. This plate contains 10 slots 61, 62, 63, 64, 65, 66, 67, 68, 69, 70, of which nine slots are always covered by the band 28, and of which in the present instance the slot 60 remains uncovered. For the sake of clearness, plate 29 is shown broken off in Fig. 11 leaving the slot 61 to 65 out. When the hand lever 43ª is adjusted to the position 3, the plate 29 is moved to such an extent that its ten slots will register with the products in which the multiplicand includes the figure 3 in the unit position, while all the other products are concealed by the plate 29.

To sum up once more, in the example referred to, the slot 59 of the band 27 reveals the column with the figures 1000 to 1198. Of this column, only the figures 1140 to 1158 are revealed by the slot 60, and this part of the column is again covered up by the plate 29, so that through the slot 68 there appears only the figure 1146. Of the rollers and tabulations, therefore, everything is concealed by the bands referred to except the small portion becoming visible at the intersecting point of the slots 59, 60 and 68, and the figure 1146 in the present instance is the desired product of the figure 2 multiplied by 573.

What I claim is:

1. A multiplying machine comprising a casing, rollers journalled therein and arranged in pairs, means for rotating said rollers, a band carried by each pair of rollers and provided with columns of figures, the figure columns of all the bands showing the entire product of any desired range of multiplication and being divided into tenths, movable strips located above said rollers and having each one or more slots, means for moving said strips, the slots in the said strips at their intersecting point being adapted to constitute a travelling window, an indicator for setting the multiplier, and indicators for setting the multiplicands, the arrangement being such that by the setting of the multiplicand the final product of the multiplication is visibly displayed in the travelling window formed by the slots in the said strips.

2. A multiplying machine as specified in claim 1, in which the rollers of each pair are positively coupled with each other, in combination with means whereby upon the setting of the multiplier all the rollers are rotated in unison, so as to place the columns of figures provided on the upper rollers all on one level.

3. A multiplying machine as specified in claim 1, in which guide rollers are provided for the strips provided with the slots, in combination with hand levers for operating said guide rollers, a scale, and an indicating finger on said hand levers adapted to cooperate with said scale.

4. A multiplying machine as specified in claim 1, in which guide rollers are provided for the strips provided with the slots, in combination with hand levers for operating said guide rollers, a scale, an indicating finger on said hand levers adapted to cooperate with said scale, chain wheels on the shafts of said guide rollers, chains passing over said chain wheels for effecting the rotation of the said guide rollers, and means for coupling said guide rollers with the said hand levers.

In testimony whereof I hereunto affix my signature in the presence of two witnesses.

RUDOLF JOKSCH.

Witnesses:
 MAX BACHEWSKI,
 CHRISTIAN M. RAUNDAL.